Patented July 17, 1928.

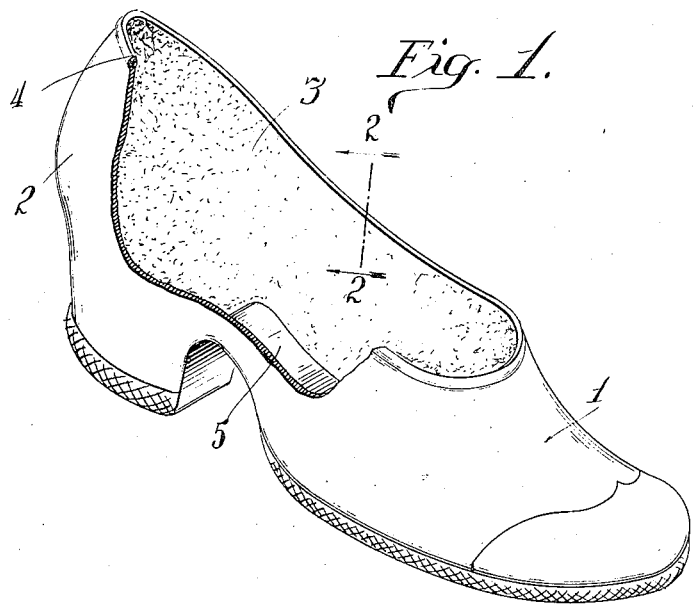
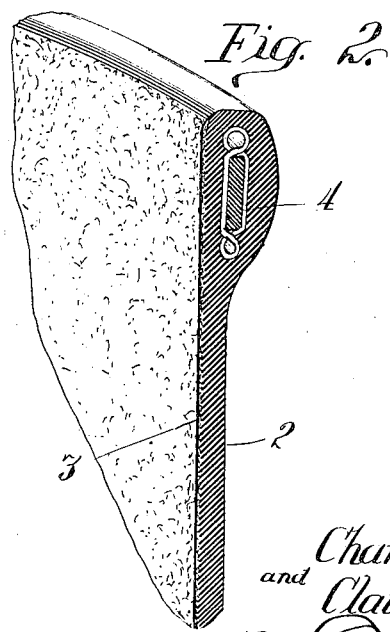

1,677,428

UNITED STATES PATENT OFFICE.

CHARLES E. BRADLEY AND CLAUDE D. MASON, OF MISHAWAKA, INDIANA, ASSIGNORS TO MISHAWAKA RUBBER AND WOOLEN MANUFACTURING COMPANY, OF MISHAWAKA, INDIANA, A CORPORATION OF INDIANA.

FOOTWEAR LINING.

REISSUED

Application filed May 19, 1927. Serial No. 192,591.

Our invention relates to rubber footwear and has reference more particularly to a construction whereby rubber footwear of light weight and having a high degree of flexibility and elasticity may be produced.

In the manufacture of rubber footwear it is important, especially in close fitting types, to provide a lining to facilitate putting on and taking off and to avoid direct contact of the rubber with the shoe and afford a non-conducting layer, permitting a movement of air between the rubber article and shoe for avoiding unpleasant heating of the foot which would otherwise occur, and it has been customary heretofore to use a lining of fabric or the like, which is cemented or otherwise affixed to the inner surface of the rubber article. Such a lining is satisfactory for ordinary and heavy duty types of rubber footwear, but it is desirable to provide finer grades of rubber footwear of light weight and having a high degree of flexibility and elasticity, and this has not been successfully accomplished heretofore, as a suitable lining was not available. A fabric lining would not do as it sacrificed flexibility and restricted the elasticity of the rubber to such an extent that it defeated the desired purpose and moreover, it would pull loose from the rubber when the latter was stretched repeatedly, as required in actual use. With our invention however, we have overcome the difficulties heretofore encountered by using a thin coating of comminuted fibers, which are applied to the inner surface of the rubber and thus provide a lining which does not affect the elasticity or flexibility of the rubber and which will not pull loose when the rubber is repeatedly stretched.

The principal objects of our invention are to produce satisfactory light weight highly elastic rubber footwear; to provide an improved lining for rubber footwear, to preserve the elasticity and flexibility of the rubber; to provide a lining which will readily shape itself to the form in which the rubber is assembled in the article of footwear; to minimize the expense of lining rubber footwear; and in general, to provide a simple and substantial lining for rubber footwear which may be easily applied and which enhances the appearance of the article of footwear.

On the drawing:

Fig. 1 is a perspective view of a common form of rubber, showing our improved lining, a portion of the side wall being broken away; and Fig. 2 is an enlarged sectional view on the line 2—2 of Fig. 1.

Referring to the drawing, the reference numeral 1 indicates a rubber of a well known type, the side wall or upper 2 of which is provided with a lining 3 in accordance with our invention. The upper is preferably made of a special quality stock with sufficient toughness to withstand the required strain and is quite elastic, and the upper edge of the side wall is preferably reinforced against splitting or tearing in a manner which will not restrict the elasticity or stretching as for example by an elastic tape 4, which is embedded in the upper edge of the side wall of the rubber and extends around the mouth of the latter. The rubber may be provided with the usual insole 5 of fabric, but the remaining inner surface of the rubber or inner surface of the upper is covered with a coating 3 of comminuted fibers, which are adhesively applied to the inner surface of the side wall of the rubber, so as to afford a complete coating which conceals and covers the inner surface of the upper.

We have found that finely divided ground cotton, wool or silk specifically known as "flock" may be used for the lining to good advantage and at the same time does not detract from the highly elastic properties of the rubber. Besides avoiding direct contact of the rubber with the shoe and providing the necessary smooth feel and consequent improvement in ease of putting on and taking off the rubber or other similar article, this flock coating also gives a nonconducting layer between the article and the leather shoe, permitting a movement of the air between the rubber and leather shoe and avoiding heating of the foot, which would otherwise occur. In addition this inner coating of flock gives an attractive appearance, as it may be colored any desired color.

The flock may be applied to the rubber in any suitable way, but we have found it advantageous to apply the flock on the stock as it comes from the calender and while the rubber is still warm and tacky. After the footwear is made up with the flock lining sticking to the inner surface of the rubber, the footwear is vulcanized in the usual manner, and this securely combines the particles of material composing the flock with the surface of the rubber, so that a permanent lining results which will withstand the usage and wear to which articles of rubber footwear are subjected.

While we have shown and described our invention in a preferred form, we are aware that various changes and modifications may be made without departing from the principles of the invention, the scope of which is to be determined by the appended claims.

We claim as our invention:

1. In an article of footwear, the combination of an upper composed entirely of elastic rubber composition with a lining of comminuted fibers applied to the inner surface thereof so that the extensibility of the lining is limited solely by the elasticity of the rubber composition.

2. In an article of footwear, the combination of an upper of highly elastic rubber composition and a freely extensible lining adhesively applied to the inner surface of the upper so that enlargement of the upper is limited solely by the elasticity of the rubber composition.

3. In an article of footwear, the combination of an elastic upper of rubber composition and a lining of separate comminuted fibers uniformly distributed over and adhesively secured to the inner surface of the upper, said lining being freely extensible so that the stretching of the upper is unrestricted thereby.

4. In an article of footwear, the combination of an upper of rubber composition and a lining therein consisting of minute separate particles of fiber unconnected except by adhesion to the rubber.

5. An article of footwear comprising a sole and an upper, the latter being composed of thin highly elastic rubber composition and a lining consisting of minute particles of fibrous material connected solely by adhesion to the rubber composition of the upper, said particles being free to move relatively with the stretching of the rubber.

CHARLES E. BRADLEY.
CLAUDE D. MASON.